United States Patent [19]

Zimmerschied et al.

[11] Patent Number: 4,492,780

[45] Date of Patent: Jan. 8, 1985

[54] PROCESS FOR THE PREPARATION OF A POLYMER DISPERSION

[75] Inventors: Klaus Zimmerschied, Wiesbaden; Helmut Rinno, Hofheim am Taunus, both of Fed. Rep. of Germany

[73] Assignee: Hoechst Aktiengesellschaft, Frankfurt am Main, Fed. Rep. of Germany

[21] Appl. No.: 453,096

[22] Filed: Dec. 27, 1982

[30] Foreign Application Priority Data

Dec. 29, 1981 [DE] Fed. Rep. of Germany ....... 3151813

[51] Int. Cl.$^3$ ............................. C08L 1/26; C08L 1/28
[52] U.S. Cl. .......................................... 524/45; 524/42; 524/43; 524/44; 524/560; 526/200
[58] Field of Search ............................ 524/560, 42–45; 526/200, 240, 311, 317

[56] References Cited

U.S. PATENT DOCUMENTS 3,806,478   4/1974   Mansour et al. .................... 526/200
4,226,754  10/1980   Yun et al. ............................ 526/240
4,265,796   5/1981   Mueller-Mall et al. ............. 524/503
4,296,226  10/1981   Braun et al. ........................ 526/316

OTHER PUBLICATIONS

Martens, Charles R., *Emulsion and Water-Soluble Paints and Coatings*, Reinhold Publishing Corp., New York, 1964, pp. 58–66.
Roempps Chemie-Lexicon, Franckh'sche Verlagshandlung Stuttgart, 7th Ed., vol. 1, 1971, p. 530.

*Primary Examiner*—John Kight
*Assistant Examiner*—Nathan M. Nutter
*Attorney, Agent, or Firm*—Curtis, Morris & Safford

[57] ABSTRACT

An aqueous polymer dispersion is prepared by polymerizing at least two different olefinically unsaturated monomers in an aqueous medium at a temperature of 30° to 100° C. and in the presence of a polymerization initiator which forms free radicals, an emulsifier, a protective colloid and, if appropriate, a chain regulator. If carboxymethylcellulose having a specific degree of substitution is used as the protective colloid, a dispersion which is particularly suitable as a binder for a gloss paint having a gel structure is obtained.

7 Claims, No Drawings

PROCESS FOR THE PREPARATION OF A POLYMER DISPERSION

The present invention relates to a process for the preparation of a polymer dispersion by polymerizing at least two different olefinically unsaturated monomers in an aqueous medium at a temperature of 30° to 100° C. in the presence of a polymerization initiator which forms free radicals, an emulsifier, a protective colloid and, if appropriate, a chain regulator, to the polymer dispersion obtainable by this process, to the use of this polymer dispersion as a binder, and to a gloss paint which has a gel structure and is based on this polymer dispersion.

It is known that resin dispersions containing copolymers based on esters of acrylic and methacrylic acid as the disperse phase are employed as binders for air-drying, water-bound paints (cf. Das deutsche Malerblatt 5/78, pages 367-369 and 8/79, pages 664-666). However, these emulsion paints are still in need of improvement with respect to their degree of gloss, rheological behavior (brushing properties, flow and gel structure) and wet adhesion; an improvement in their gel structure is particularly desirable.

It is also known that film-forming polymers which constitute homopolymers or copolymers, emulsifiable in water, of vinyl esters, esters of acrylic and methacrylic acid, styrene, acrylonitrile or butadiene, form the basis of thixotropic, aqueous coating agents (cf. German Pat. No. 1,242,306 = British Pat. No. 922,456). These coating agents contain a titanium chelate compound and, as a protective colloid, a natural or synthetic, water-soluble organic colloid containing hydroxyl groups, in particular derivatives of starch, cellulose or polyvinyl alcohol, for example hydroxyethylcellulose and sodium carboxymethylcellulose. However, the preparation of the polymer dispersion is not described in this text.

The preparation of aqueous polymer dispersions by polymerizing a mixture of monomers composed of at least 80 percent of acrylic monomers and/or styrene in an aqueous emulsion and in the presence of a cellulose derivative is also known (cf. British Pat. No. 1,466,660). Suitable cellulose derivatives in this field are hydroxyethylcellulose and carboxymethylated hydroxyethylcellulose; the cellulose derivatives are employed in an amount of 0.01 to 10 percent by weight (relative to monomers). The polymerization must be carried out in the presence of a chain regulator, which is used in an amount of 0.01 to 10 percent by weight (relative to monomers). The dispersions are suitable for the preparation of thixotropic mixtures for use as paints, adhesives and coating agents.

Finally, the preparation of aqueous polyacrylate dispersions having an improved flow behavior has also been described (cf. European Published Application No. 9,772 = U.S. Pat. No. 4,265,796). In this process the monomers are polymerized under customary conditions in an aqueous emulsion and in the presence of 0.01 to 2 percent by weight of protective colloids. The protective colloids used are, in particular, hydroxyalkylcelluloses and also carboxymethylcelluloses. In the polymerization, a water-soluble chain regulator is employed in an amount of 0.05 to 5 percent by weight in the reaction vessel and in the feed. The dispersions are stated to have good compatibility with pigments and an advantageous flow behavior and to be suitable as binders for paints.

The object of the invention is the preparation of an aqueous polymer dispersion which is based on copolymers having a predominant proportion of esters of acrylic acid and/or methacrylic acid, and which is suitable for the preparation of a paint having a gel structure.

The invention relates to a process for the preparation of a polymer dispersion by polymerizing (a) one or more esters of acrylic acid and/or methacrylic acid with an alcohol containing 1 to 10 carbon atoms, (b) 0.1 to 10 percent by weight (relative to the total quantity of monomers) of at least one water-soluble, unsaturated carboxylic acid or a water-soluble derivative of an unsaturated carboxylic acid and (c) 0 to 30 percent by weight (relative to the total quantity of monomers) of at least one monoolefinically unsaturated compound which is different from the above-mentioned components (a) and (b), in an aqueous medium, at a temperature of 30° to 100° C. and in the presence of a polymerization initiator which forms free radicals, an emulsifier, a protective colloid and, if appropriate, a chain regulator, which comprises using water-soluble carboxymethylcellulose having an average degree of substitution of 0.3 to 0.65 as the protective colloid.

The invention also relates to the copolymer dispersion obtainable by the abovementioned process and to the use of this copolymer dispersion as a binder for a gloss paint having a gel structure.

The essential characteristic of the invention is the use of water-soluble carboxymethylcellulose as the protective colloid. The average degree of substitution of the carboxymethylcellulose is 0.3 to 0.65, preferably 0.4 to 0.55, the degree of substitution being understood as meaning the average number of carboxymethyl groups introduced per anhydroglucose unit. The viscosity of a 2 percent strength by weight aqueous solution of the carboxymethylcellulose at a temperature of 25° C. is preferably 1 to 10,000 mPa.s, in particular 5 to 1000 mPa.s. The carboxymethylcellulose is preferably employed in the form of its alkali metal salt, for example as the sodium, potassium or ammonium salt. It is advantageously used in an amount of 0.05 to 5, preferably 0.1 to 2, percent by weight (relative to the total quantity of monomers).

The cellulose ethers used in accordance with the invention optionally also contain further substituents, particularly alkyl or hydroxyalkyl radicals having 1 to 4 carbon atoms, alkoxyalkyl radicals having 2 to 6 carbon atoms or dialkylamino radicals having a total of 2 to 6 carbon atoms. Examples of suitable compounds are methylcarboxymethylcellulose, ethylcarboxymethylcellulose, hydroxyethylcarboxymethylcellulose, hydroxypropylcarboxymethylcellulose, methoxyethylcarboxymethylcellulose, ethoxyethylcarboxymethylcellulose and diethylaminocarboxymethylcellulose.

At least two groups of monomers are employed for the polymerization process according to the invention, namely (a) one or more esters of acrylic acid and/or methacrylic acid with an alcohol containing 1 to 10 carbon atoms, (b) 0.1 to 10, preferably 0.5 to 4, percent by weight (relative to the total quantity of monomers) of at least one water-soluble, unsaturated monocarboxylic or dicarboxylic acid or a water-soluble derivative of an unsaturated monocarboxylic or dicarboxylic acid, and (c) 0 to 30, preferably 1 to 15, percent by weight (relative to the total quantity of monomers) of at least one monoolefinically unsaturated compound which is different from the abovementioned components (a) and (b).

The monomers of the group (a), which are used on their own or as a mixture, include both "plasticizing" monomers, i.e. acrylic acid esters and higher esters of methacrylic acid, and "hardening" monomers, i.e. lower esters of methacrylic acid. If several monomers are used, the proportion of "plasticizing" and "hardening" monomers in relation to the total quantity of monomers in a particular case is selected so that the resulting dispersion has a minimum film-forming temperature (MFT) (cf. DIN 53,787) of not more than 70° C., preferably not more than 40° C. and, particularly, within the range from 5° to 30° C. Examples of monomers of group (a) are methyl acrylate, ethyl acrylate, n-propyl acrylate, n-butyl acrylate, i-butyl acrylate, n-hexyl acrylate, n-octyl acrylate, 2-ethylhexyl acrylate, n-octyl methacrylate and 2-ethylhexyl methacrylate and also methyl methacrylate, ethyl methacrylate, n-propyl methacrylate, n-butyl methacrylate, i-butyl methacrylate and t.-butyl methacrylate.

The monomers of the group (b) preferably include monoolefinically unsaturated monocarboxylic and dicarboxylic acids having 3, 4 or 5 carbon atoms, for example acrylic acid, methacrylic acid, vinylacetic acid, crotonic acid, maleic acid, fumaric acid and itaconic acid, and also amides and N-substituted amides of the above-mentioned acids, for example acrylamide, methacrylamide, N-methylolacrylamide, N-methylolmethacrylamide and N-alkyl(meth)acrylamides having 1 to 4 carbon atoms in the alkyl radical, monoalkyl esters of olefinically unsaturated dicarboxylic acids having 4 or 5 carbon atoms and 1 to 8 carbon atoms in the alkyl radical, for example monomethylmaleate and 2-ethylhexylmaleate, and also salts, preferably alkali metal salts, of the abovementioned acids. These monomers are employed on their own or as a mixture.

Suitable monomers of group (c) are, inter alia, styrene and vinyl esters, in particular vinyl esters of linear or branched monocarboxylic acids having 2 to 12 carbon atoms. Examples of these are vinyl acetate, vinyl propionate, vinyl butyrate, vinyl isobutyrate, vinyl isononate and vinyl decanates. Comonomers of the group (c) also include compounds which impart a particularly good wet adhesion to the films prepared from the polymer dispersion obtained in accordance with the invention. Comonomers of this type are vinylpyridine and, in particular, olefinically unsaturated compounds containing acetylacetoxy groups, such as esters of acetoacetic acid, for example vinyl acetoacetate and allyl acetoacetate, and acetylacetoxyalkyl (meth)-allyl ethers having 2 to 5 carbon atoms in the alkyl radical, for example 2-acetylacetoxyethyl allyl ether, 2-acetylacetoxypropyl allyl ether and 2-acetylacetoxypropyl methallyl ether (cf. German Offenlegungsschrift No. 2,927,932=U.S. Pat. No. 4,296,226). The monomers of group (c) can also be employed as a mixture, provided that they are copolymerizable.

The polymerization is carried out in an aqueous medium at a temperature of 30° to 100° C., preferably 50° to 90° C., and the procedure can be continuous or discontinuous; in the latter case a batch process, a monomer metering process or an emulsion metering process is employed.

It is preferable to employ the emulsion metering process, in which a mixture of water and up to 20, preferably 2 to 10, percent by weight of an aqueous monomer emulsion is initially taken in a reaction vessel. The monomer emulsion is composed of water, the monomers, the emulsifier or emulsifiers, the initiator or initiators and, if appropriate, the chain regulator. The initial mixture is warmed to polymerization temperature and, after the reaction has set in, the remainder of the monomer emulsion is metered in while maintaining the desired reaction temperature and agitating, preferably stirring, the reaction mixture continuously. When metering of the emulsion is complete, the dispersion is heated for a further period and, after subsequently cooling to room temperature, its pH is adjusted to a value higher than 8, preferably 8.5 to 9.5, by adding aqueous ammonia solution. The polymer dispersion thus obtained is particularly suitable as a basis for gloss paints having a pronounced gel structure.

The polymerization is carried out in the presence of a polymerization initiator which forms free radicals and which is preferably employed in an amount of 0.1 to 1.5 percent by weight (relative to the total quantity of monomers). The initiator is oil-soluble or, preferably, water-soluble. The following are particularly suitable: hydrogen peroxide, alkali metal salts or ammonium salts of persulfuric acid, peroxydisulfuric acid or peroxydiphosphoric acid, for example sodium persulfate, sodium peroxydisulfate, potassium peroxydisulfate and ammonium peroxydisulfate, and also alkyl hydroperoxides, such as t.-butyl hydroperoxide, dialkyl peroxides, such as di-t-butyl peroxide, diacyl peroxides, such as diacetyl peroxide, dilauroyl peroxide and dibenzoyl peroxide, and azodiisobutyronitrile and the sodium salt of azo-γ,γ'-bis-(4-cyanovaleric acid). If appropriate, the initiator is employed together with a reducing agent, in particular an ammonium salt, alkali metal salt or alkaline earth metal salt of a sulfur-containing acid having a reducing action; sulfites, bisulfites, pyrosulfites, dithionites, thiosulfates and formaldehyde sulfoxylates are particularly suitable. Several initiators are also employed, if desired.

Emulsifiers present during the polymerization are nonionic or, preferably anionic, emulsifiers; the emulsifiers are used in an amount of 0.2 to 5 percent by weight (relative to the total quantity of monomers). Suitable emulsifiers are, in particular, alkali metal salts or ammonium salts of alkylsulfonic acids, arylsulfonic acids or alkylarylsulfonic acids, and also the corresponding sulfates, phosphates or phosphonates, which, if desired, contain oxethylene units between the hydrocarbon radical concerned and the anionic group. Examples of these are sodium laurylsulfate, sodium octylphenolglycol ether-sulfate, sodium dodecylbenzenesulfonate, sodium lauryldiglycolsulfate, ammonium t.-butylphenolpentaglycolsulfate, ammonium tri-sec.-butylphenoloctaglycolsulfate, ammonium n-octylphenoldiglycolsulfate, ammonium lauryldiglycolsulfate, ammonium dodecylsulfate containing 30 to 50 oxethylene units and ammonium octylphenolsulfate containing 25 oxethylene units.

If desired, the nonionic emulsifier is employed in combination with an anionic emulsifier or with several anionic emulsifiers. Suitable nonionic emulsifiers are, in particular, polyglycol ethers of long-chain aliphatic alcohols which preferably contain 10 to 20 carbon atoms, or of alkylphenols in which the alkyl radical preferably contains 6 to 12 carbon atoms, or of dialkylphenols or trialkylphenols in which the alkyl radicals are preferably branched alkyl radicals having 3 to 12 carbon atoms in each case. The number of oxethylene units in these compounds is within the range from 6 to 50. Examples of these compounds are reaction products of ethylene oxide with lauryl alcohol, stearyl alcohol, oleyl alcohol, coconut oil alcohol, octylphenol, nonylphenol, diisopropylphenol, triisopropylphenol, di-t.-butylphenol and tri-s-butylphenol. Reaction products of ethylene oxide with polypropylene glycol or polybutylene glycol are also suitable.

The process according to the invention is carried out in some cases in the presence of a chain regulator, which is employed in an amount of not more than 3 percent by weight (relative to the total quantity of monomers). Suitable chain regulators are mercaptans, in particular alkyl mercaptans having 4 to 16 carbon atoms, for example n-butyl mercaptan, t-butyl mercaptan and n-dodecyl mercaptan, and also thioglycol, thioglycerol and thioglycolic acid. Several chain regulators are also employed, if appropriate.

The polymer dispersion obtainable in accordance with the invention is suitable for use, with particular advantage, as a binder for surface coatings, preferably for gloss paints, having a pronounced gel structure; the addition of titanium chelate compounds, which would otherwise be customary, is not absolutely necessary. The solids content of the polymer dispersion is usually within the range from 35 to 60, preferably 40 to 55, percent by weight.

When surface coatings are prepared from the polymer dispersions obtainable in accordance with the invention, the customary additives are employed, namely pigments, thickeners, dispersing auxiliaries, anti-foaming agents, flow auxiliaries, film-forming auxiliaries, preservatives and, if desired, fillers. The pigments used are, in particular, titanium dioxide (rutile grade) and organic pigments, such as azo pigments, azo toners, copper phthalocyanine, quinacridones and dioxazines. Examples of suitable fillers are barium sulfate, calcium carbonate, calcium/magnesium carbonate, calcium/magnesium silicate and kaolin. Suitable thickeners are the completely or partially water-soluble macromolecular substances customary in paint manufacture, such as cellulose derivatives, homopolymers and copolymers of unsaturated carboxylic acids in the form of their alkali metal salts, ammonium salts or amine salts, and copolymers formed from an alkyl half-ester of maleic acid and an alkyl vinyl ether or styrene. Examples of dispersing auxiliaries are alkali metal salts or ammonium salts of polyacrylic acid, polymethacrylic acid, polyvinylsulfonic acid or polyphosphoric acid or of copolymers formed from (meth)-acrylic acid and (meth)-acrylic acid esters or of copolymers formed from maleic acid and unsaturated hydrocarbons. Examples of anti-foaming agents which are employed are aliphatic hydrocarbons and polysiloxane and mixtures thereof, while suitable flow auxiliaries are, in particular, ethanediol, 1,2-propanediol and 2-methyl-n-pentane-2,4-diol. Customary film-forming auxiliaries are glycols, glycol ethers and glycol esters of monoglycol ethers, for example ethylglycol, butylglycol, ethylglycol acetate, butylglycol acetate and butyldiglycol acetate and, in particular, 2,2,4-trimethyl-3-hydroxypentyl isobutyrate and methoxybutanol. Suitable preservatives are, in particular, commercial products containing chloroacetamide.

When using paints of this type it is very advantageous if the paints have a reversible gel structure; at low shear forces they are then so highly viscous that they do not drip while, on the other hand, at high shear forces, such as arise, for example, when brushing, rolling and spraying, the gel structure is destroyed, so that easy spreading is possible. In this respect, the viscosity of the paint should be sufficiently low for unevennesses, for example brush marks or wrinkles caused by brush application, to be able to flatten themselves, but, on the other hand, should be sufficiently high for "tear and sag formation" not to occur on vertical surfaces. A good flow is obtained.

The advantages of paints having a gel structure compared with those having the customary flow properties are that they do not drip off so readily from the brush and a thicker coat can be applied without the latter becoming irregular or uneven. A paint having a gel structure collapses when vigorously stirred on when under strong shearing forces, for instance when applied by brush, to give a free-flowing liquid, i.e. the viscosity falls during application to normal values, such as are customary in the case of paints not having a gel structure, and the brush marks flow away when the exposure to shearing stress ceases. When left at rest, the paint then re-forms a gel structure, so that, although the brush marks can still level themselves out, no "sags" can form when the paint is applied to vertical surfaces. In addition, a paint having a gel structure of this type enables a substantially thicker layer of paint to be applied in a single operation than is possible in the case of paints having a normal flow behavior. Furthermore, the painter can work faster and more efficiently, since, as a result of the absence of a tendency to drip, the application devices can take up a larger quantity of paint every time fresh paint is taken up, than is possible in the case of paints having conventional flow properties. Another important factor is the speed at which the gel structure builds up in the paints: on the one hand this must not take place too rapidly, for example as early as in the mixing vessel when the paints are being formulated or filled into containers, on the other hand, however, it must also not take place too slowly, since otherwise the desired advantageous rheological properties will not be obtained at the proper time.

The examples which follow serve to illustrate the invention in greater detail. Percentages relate in each case to weight.

EXAMPLE 1

A mixture of 250 g of water and 250 g of a monomer emulsion is initially taken in a reaction vessel situated in a heating bath and equipped with a stirrer, a reflux condenser, a dropping funnel and a thermometer.

The monomer emulsion has the following composition:

764 g of water,
550 g of methyl methacrylate,
450 g of 2-ethylhexyl acrylate,
10 g of methacrylic acid,
33 g of a 50 percent strength aqueous solution of the sodium salt of a tri-sec.-butylphenol which has been ethoxylated with 7-8 moles of ethylene oxide and sulfated,
2 g of ammonium peroxydisulfate and
5 g of sodium carboxymethylcellulose having a degree of substitution of 0.57, a 2 percent strength aqueous solution of which has a viscosity of 140 mPa.s at 25° C.

The pH of the monomer emulsion is adjusted to a value of 4 by means of aqueous ammonia solution (25 percent strength).

The initial mixture is first warmed to a temperature of 85° C., while stirring, and the remainder of the monomer emulsion is then metered in in the course of 150 minutes. In the course of this, the temperature of the reaction mixture is kept at 85° C. The mixture is then heated at 85° C. for a further 60 minutes. After cooling to room temperature, the pH of the resulting dispersion is adjusted to a value of 9 by adding 25 percent strength aqueous ammonia solution. The dispersion has a solids content of 49.5%.

COMPARISON EXAMPLE 1

Example 1 is repeated, with the difference that the monomer emulsion now contains 5 g of sodium carboxymethylcellulose having a degree of substitution of 1.34, a 2 percent strength aqueous solution of which has a viscosity of 340 mPa.s at 25° C. The dispersion has a solids content of 49.8%.

EXAMPLE 2

Example 1 is repeated using a monomer emulsion of the following composition:
764 g of water,
530 g of methyl methacrylate,
470 g of n-butyl acrylate,
10 g of methacrylic acid,
10 g of allyl acetoacetate,
5 g of a 50 percent strength aqueous solution of the sodium salt of a tri-sec.-butylphenol which has been ethoxylated with 7-8 moles of ethylene oxide and sulfated,
2 g of ammonium peroxydisulfate,
2 g of n-dodecyl mercaptan and
3 g of sodium carboxymethylcellulose having a degree of substitution of 0.45, a 2 percent strength aqueous solution of which has a viscosity of 12 mPa.s.

The resulting dispersion has a solids content of 49.2%.

COMPARISON EXAMPLE 2

Example 2 is repeated, with the difference that the monomer emulsion now contains 3 g of sodium carboxymethylcellulose having a degree of substitution of 1.34, a 2 percent aqueous solution of which has a viscosity of 340 mPa.s at 25° C. The dispersion has a solids content of 49.3%.

EXAMPLE 3

A mixture of 475 g of water and 61.5 g of a monomer emulsion is initially taken in a reaction vessel situated in a heating bath and equipped with a stirrer, a reflux condenser, a dropping funnel and a thermometer.

The monomer emulsion has the following composition:
549 g of water,
540 g of methyl methacrylate,
460 g of n-butyl acrylate,
10 g of methacrylic acid,
10 g of a 50 percent strength aqueous solution of the sodium salt of a tri-sec.-butylphenol which has been ethoxylated with 7-8 moles of ethylene oxide and sulfated,
5 g of ammonium peroxydisulfate and
2 g of n-dodecyl mercaptan.

The initial mixture is first warmed to a temperature of 85° C., while stirring, and the remainder of the monomer emulsion is then metered in in the course of 150 minutes. During the last 75 minutes of the addition of the monomer emulsion, a solution of 531 g of water of 45 g of sodium carboxymethylcellulose having a degree of substitution of 0.45, a 2 percent strength aqueous solution of which has a viscosity of 12 mPa.s at 25° C., is metered in. The mixture is then heated at 85° C. for a further 60 minutes. After cooling to room temperature, the pH of the resulting dispersion is adjusted to a value of 9 by adding 25 percent strength aqueous ammonia solution. The dispersion has a solids content of 40.7%.

EXAMPLE 4

Example 3 is repeated with the difference that 1 g of sodium carboxymethylhydroxyethylcellulose having a degree of substitution of 0.4 (carboxymethyl) and of 0.3 (hydroxyethyl), a 2 percent strength aqueous solution of which has a viscosity of 50 mPa.s at 25° C., is now present in the vessel, and the monomer emulsion now contains 703 g of water.

The resulting dispersion has a solids content of 46.1%.

EXAMPLE 5

Example 3 is repeated, with the difference that 1 g of sodium carboxymethylhydroxyethylcellulose having a degree of substitution of 0.3 (carboxymethyl) and of 0.7 (hydroxyethyl), a 2 percent strength solution of which has a viscosity of 33 mPa.s at 25° C., is now present in the vessel, and the monomer emulsion now contains 500 g of methyl methacrylate, 500 g of i-butyl acrylate and 10 g of methacrylic acid as the monomers.

The resulting dispersion has a solids content of 45.9%.

EXAMPLE 6

Example 3 is repeated using a monomer emulsion of the following composition:
549 g of water,
450 g of methyl methacrylate,
200 g of styrene,
10 g of methacrylic acid,
350 g of n-butyl acrylate,
10 g of a 50 percent strength aqueous solution of the sodium salt of a tri-sec.-butylphenol which has been ethoxylated with 7-8 moles of ethylene oxide and sulfated,
5 g of ammonium peroxydisulfate and
2 g of n-dodecyl mercaptan.

A solution, in 154 g of water, of 5 g of sodium carboxymethylhydroxyethylcellulose having a degree of substitution of 0.3 (carboxymethyl) and of 0.7 (hydroxyethyl), a 2 percent strength aqueous solution of which has a viscosity of 33 mPa.s at 25° C., is also employed as a protective colloid solution. Metering in of this solution begins 60 minutes after the start of the metering in of the monomer emulsion and is complete after a further 90 minutes.

The resulting dispersion has a solids content of 46.1%.

EXAMPLE 7

Example 3 is repeated using a monomer emulsion of the following composition:
549 g of water, 450 g of methyl methacrylate,
550 g of ethyl acrylate,
10 g of methacrylic acid,
10 g of a 50 percent strength aqueous solution of the sodium salt of a tri-sec.-butylphenol which has been ethoxylated with 7-8 moles of ethylene oxide and sulfated,
5 g of ammonium peroxydisulfate and
2 g of n-dodecyl mercaptan.

A solution, in 154 g of water, of 3 g of sodium carboxymethylhydroxyethylcellulose having a degree of substitution of 0.4 (carboxymethyl) and of 0.3 (hydroxyethyl), a 2 percent strength aqueous solution of which has a viscosity of 50 mPa.s at 25° C., is also employed as a protective colloid solution.

The resulting dispersion has a solids content of 45.9%.

EXAMPLE 8

Example 6 is repeated using a monomer emulsion of the following composition:
549 g of water,
1,000 g of t.-butyl acrylate,
15 g of methacrylic acid,
10 g of acrylic acid,
10 g of a 50 percent strength aqueous solution of the sodium salt of a tri-sec.-butylphenol which has been ethoxylated with 7-8 moles of ethylene oxide and sulfated,
5 g of ammonium peroxydisulfate and
2 g of n-dodecyl mercaptan.

The sodium carboxymethylhydroxyethylcellulose is employed in an amount of 3 g.

The resulting dispersion has a solids content of 46.4%.

USE EXAMPLES

The dispersions obtained in accordance with Examples 1 to 8 and Comparison Examples 1 and 2 are used to prepare gloss paints, and the gel structure of the latter is tested. This is effected in each case by first preparing a pigment paste by dispersing together the following constituents for 20 minutes in a Dissolver at a stirrer speed of 6,000 r.p.m.:
278 g of water,
1,000 g of 1,2-propanediol,
46 g of a 40 percent strength aqueous solution of a polyacrylate salt (the commercially available dispersing agent ®Dispex G 40),
17.5 g of a mixture of an aliphatic hydrocarbon and a silicone (the commercially available anti-foaming agent ®Nopco NXZ),
10 g of a chloroacetamide/alkali metal fluoride mixture (the commercially available preservative ®Mergal AF),
30 g of a 25 percent strength aqueous solution of sodium benzoate and
2,750 g of titanium dioxide (rutile grade, particle size 0.2-0.4 μm) (the commercially available pigment ®Kronos RN 63).

After reducing the stirrer speed to 1,500 r.p.m., the following substances are added successively to the mixture thus obtained: the polymer dispersion according to Examples 1 to 8, in such a quantity that 3,540 g of solid are present, 300 g of 2,2,4-trimethyl-3-hydroxypentyl isobutyrate and 200 g of a 30 percent strength aqueous solution of sodium polyacrylate (the commercially available thickener ®Viscalex VG 2).

If necessary, the pH of each of the paints thus obtained is adjusted to a value of 9 by adding 25 percent strength aqueous ammonia solution. The gel structure of each paint is determined after a storage time of 1 week. The instrument used for measuring is the Gel-Strength-Tester made by Sheen Instruments (Sales) Ltd., Richmond; the maximum torque (g/cm), at rupture of the gel structure, on a disk stirrer immersed in the paint is taken as a measure of the gel structure. The reflectance value of films which have been produced from the paints on glass and have been dried at room temperature for 1 week, is also determined using a commercially available gloss meter at an angle of 20° and of 60°.

The values determined are listed in the table below (gel structure 1 and reflectance value 1). The table also contains the values determined on analogous paints, each of which contains, in addition, 35 g of a commercially available titanium chelate compound (Tilcom AT 23) (gel structure 2 and reflectance value 2).

TABLE

| Polymer dispersion according to Example | Gel structure 1 (g/cm) | Reflectance value 1 | | Gel structure 2 (g/cm) | Reflectance value 2 | |
|---|---|---|---|---|---|---|
| | | 20 degrees | 60 degrees | | 20 degrees | 60 degrees |
| 1 | 37 | 38 | 81 | 55 | 40 | 80 |
| 2 | 74 | 55 | 83 | 248 | 60 | 85 |
| 3 | 75 | 24 | 64 | 122 | 22 | 62 |
| 4 | 13 | 64 | 83 | 101 | 55 | 81 |
| 5 | 24 | 61 | 83 | 57 | 57 | 80 |
| 6 | 336 | 41 | 83 | 450 | 26 | 75 |
| 7 | 243 | 33 | 77 | 258 | 36 | 77 |
| 8* | 264 | 53 | 77 | 266 | 57 | 78 |
| Comparison 1 | 5 | 47 | 80 | 16 | 51 | 82 |
| Comparison 2 | 26 | 35 | 81 | 24 | 36 | 80 |

*The quantity of film-forming auxiliary here is 500 g.

We claim:
1. The method of making a polymer dispersion, which method comprises polymerizing:
   (a) at least one ester of acrylic acid and/or methacrylic acid with an alcohol having 1 to 10 carbon atoms,
   (b) 0.1 to 10 percent, by weight of all the monomers, of at least one water soluble unsaturated carboxylic acid or of one water soluble derivative of such an acid, and
   (c) 0 to 30 percent, by weight of all the monomers, of at least one mono-olefinically unsaturated compound which is different from any compound in (a) or (b) above, in an aqueous medium at a temperature from 30° C. to 100° C. in the presence of free radical-forming polymerization initiator, an emulsifier, and of a protective colloid which is water soluble carboxymethylcellulose having an average degree of substitution from 0.3 to 0.65.

2. A method as in claim 1 wherein said polymerization is carried out in the presence of a chain regulator.

3. A method as in claim 1 wherein said carboxymethylcellulose is present in an amount from 0.1 to 5 percent, by weight of all the monomers.

4. A method as in claim 1 wherein a 2 percent by weight aqueous solution of said carboxymethylcellulose has a viscosity from 1 to 10,000 mPa.s at a temperature of 25° C.

5. A method as in claim 1 wherein said carboxymethylcellulose is additionally substituted by alkyl or hydroxyalkyl having 1 to 3 carbon atoms, by alkoxyalkyl having 2 to 6 carbon atoms, or by dialkylamine having 2 to 6 carbon atoms.

6. A polymer dispersion made by the method of claim 1.

7. A gloss paint having a gel structure and comprising a pigment and a polymer dispersion made by the method of claim 1.

* * * * *